July 9, 1946.  W. G. MITCHELL  2,403,675
TOOL FOR INSTALLING TUBULAR RIVETS
Filed June 11, 1943  3 Sheets-Sheet 2

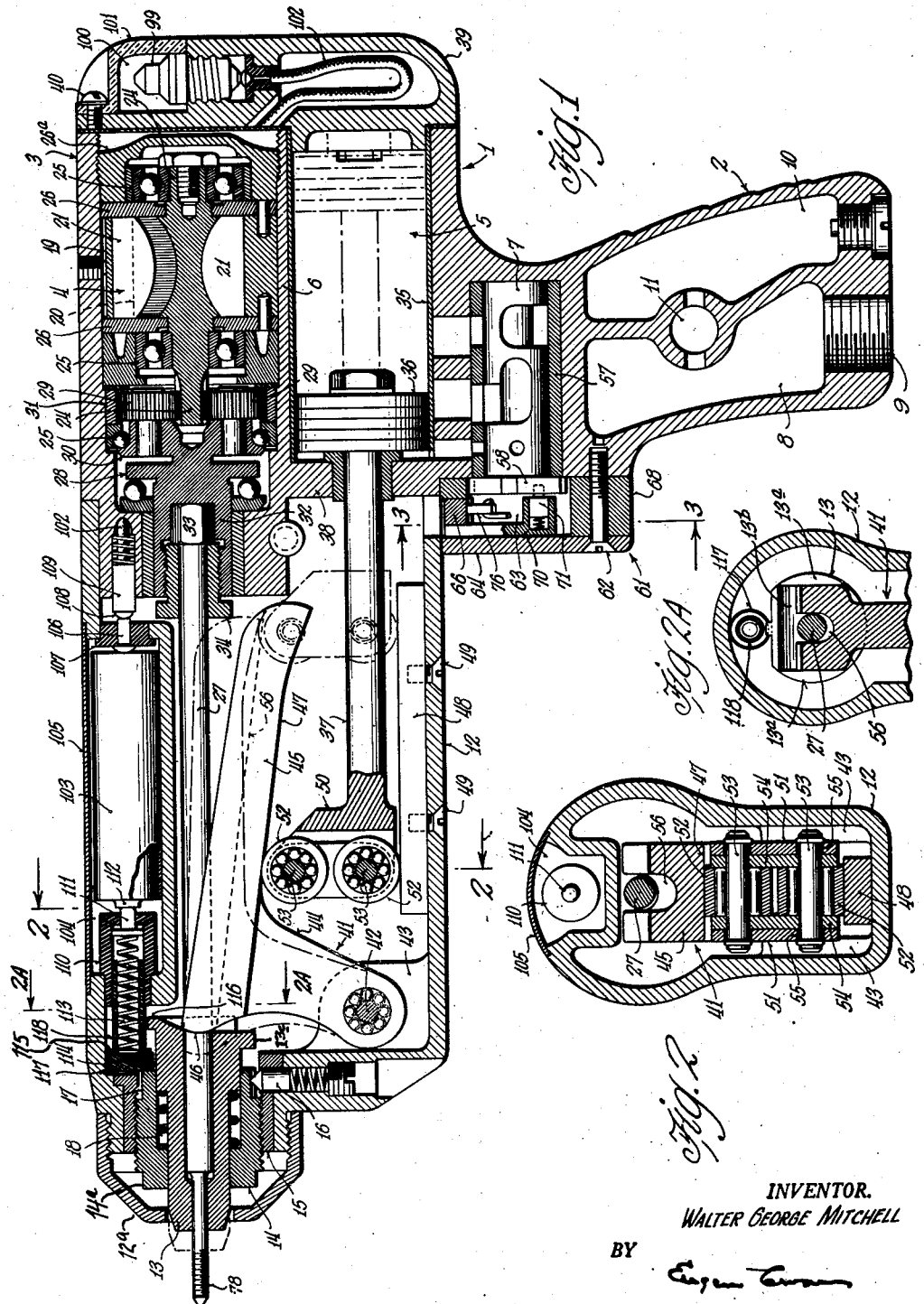

INVENTOR.
WALTER GEORGE MITCHELL
BY
ATTORNEY.

July 9, 1946.  W. G. MITCHELL  2,403,675
TOOL FOR INSTALLING TUBULAR RIVETS
Filed June 11, 1943  3 Sheets-Sheet 3
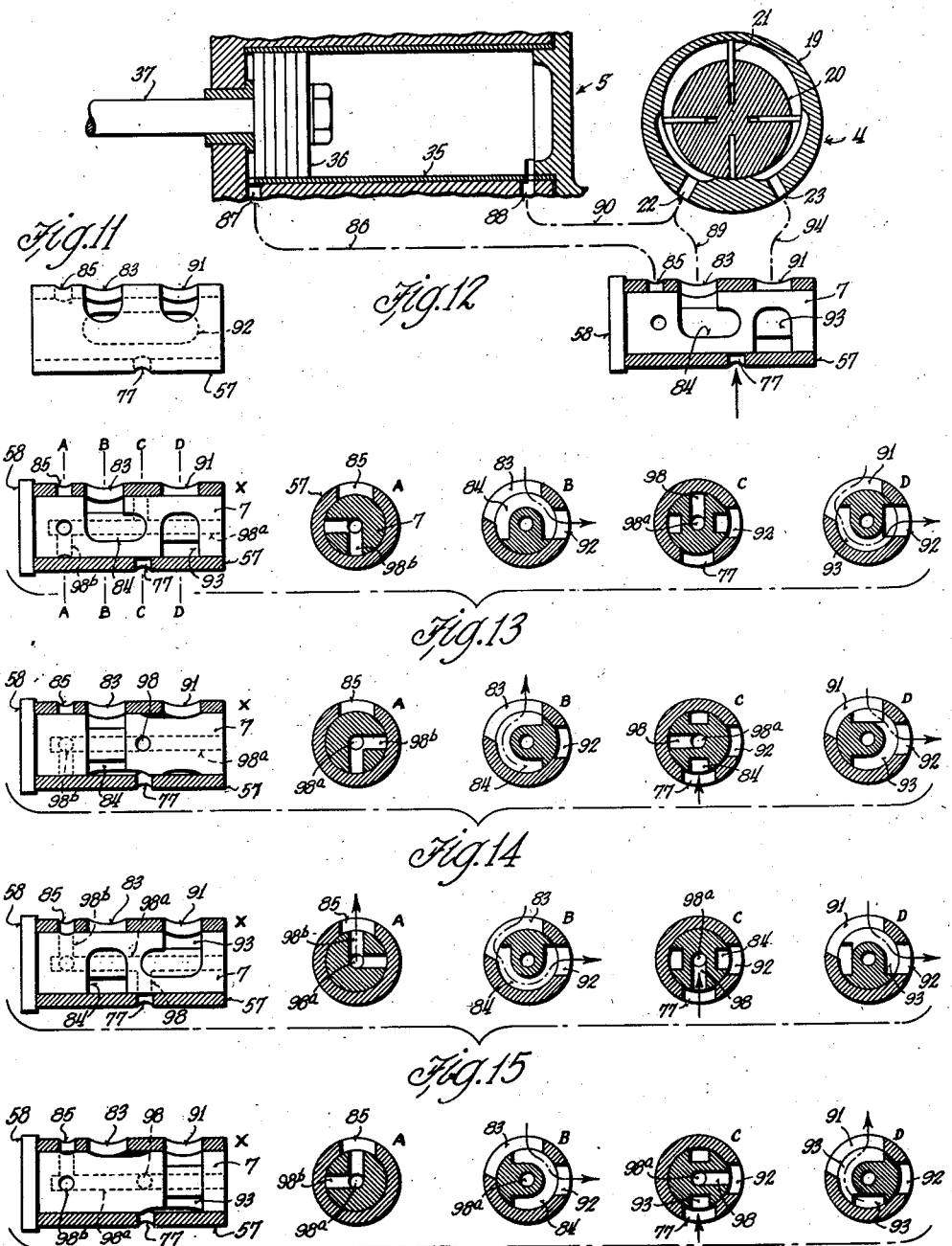
INVENTOR.
WALTER GEORGE MITCHELL
BY
ATTORNEY.

Patented July 9, 1946

2,403,675

UNITED STATES PATENT OFFICE 2,403,675

TOOL FOR INSTALLING TUBULAR RIVETS

Walter George Mitchell, Aurora, Ill., assignor to Independent Pneumatic Tool Company, Chicago, Ill., a corporation of Delaware Application June 11, 1943, Serial No. 490,546

22 Claims. (Cl. 218—19)

This invention relates to power operated tools for installing internally threaded tubular rivets for blind riveting operations in airplane and other work.

The principal object and purpose of my invention is to provide a simple and effective portable power operated hand manipulated tool for installing these tubular rivets, the invention having among its specific objects the following:

To provide a tool construction in which the action and reaction members are in the form of relatively movable anvil and rotary spindle elements, respectively, mounted on the tool support, the spindle having a swiveled connection with the tool support for rotation to engage and disengage the threaded portion of the rivet and fixed against endwise movement with respect to the tool support, whereby pressing the anvil outwardly of the tool support by the power means of the tool when engaged against the rivet in the work imparts movement to the spindle and the support relatively to the anvil to collapse or upset the rivet engaged by the spindle;

To provide a tool structure in which the power operated motor means employed for respectively rotating the spindle and pressing the anvil outwardly of the tool support against the rivet are selectively controlled by a single control means operable by the operator holding the tool to simplify and facilitate the handling and manipulation of the tool;

To provide the control means in the form of a single rotary member movable into a number of successive rotative positions to control the operation of the tool motors in the desired cycle, to wit, to rotate the spindle to engage the rivet, to press the anvil against the rivet in the riveting stroke of the tool, and thereafter rotate the spindle in reverse to release the spindle from the collapsed rivet and return the power means to the start of the riveting stroke;

To provide the control means with a single actuating lever which by a ratchet or equivalent mechanism enables the control member to be turned through said respective rotative positions in the successive operations of the lever;

To provide a signal device in the tool structure for indicating to the operator when the riveting stroke of the tool has been completed;

To provide a switch mechanism for the signal device and which switch mechanism is operable in the riveting stroke of the tool at the terminus thereof;

To provide an adjustment in the tool whereby the riveting stroke of the tool may be adjusted to control the amount of set or compression to be given to the rivet in upsetting or collapsing the same; and To provide an interconnection between the anvil and the lever of the riveting stroke producing mechanism of the tool to prevent rotation of the anvil with respect to the rivet.

The invention consists further in the features of structure hereinafter described and claimed.

In the accompanying drawings—

Fig. 1 is a longitudinal sectional view with parts in elevation of a riveting tool constructed in accordance with my invention;

Fig. 2 is a cross-sectional view taken on line 2—2 of Fig. 1;

Fig. 2A is a sectional view taken on line 2A—2A of Fig. 1 to show details of construction to be later described;

Fig. 11 is a side view of the bushing for the rotary control valve;

Fig. 12 is a diagrammatic view indicating the passage arrangement in the tool construction for connecting the two pressure fluid responsive motors through the control valve; and Figs. 13 to 16 inclusive are diagrammatic views illustrating the various rotative positions of the control valve in supplying pressure fluid to the respective tool motors in the operation of the tool.

Figure 3:
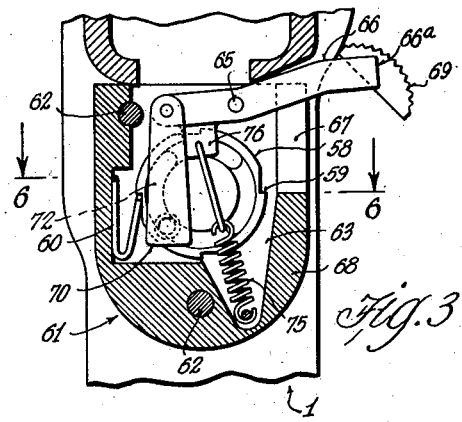
Fig. 3 is a cross-sectional view with parts in elevation taken on line 3—3 of Fig. 1 to show the actuating mechanism for the rotary control valve of the tool.
Figure 7:
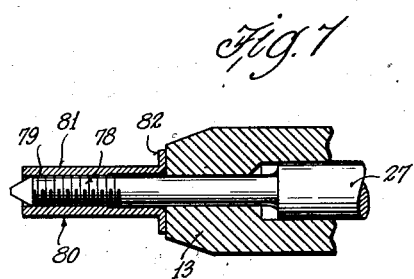
Fig. 7 is a longitudinal sectional view with parts in elevation showing the spindle in engagement with the threaded portion of the tubular rivet in the first step of connecting these parts.

In the tool structure shown in the drawings, 1 indicates the frame or main support of the tool preferably in the form of a casting shaped to provide a pistol grip type of handle 2 and a section 3 to house and mount the two motor elements 4, 5 of the tool. These motor elements 4, 5 are arranged one above the other in parallel and both in the embodiment shown are pneumatically operated. The upper motor element 4 which is of the rotary type is divided from the lower motor element 5 which is of the reciprocable type by a wall section 6 providing a part of the frame casting as shown in Fig. 1. The live or compressed air required to operate the motor elements is supplied thereto under the control of a manually operable control valve 7 rotatably mounted within the handle 2 below the lower motor element 5. The handle 2 is provided with an air supply passage 8 having a tapped opening 9 at the lower or butt end of the handle for connection with an air supply hose (not shown). The handle member 2 has a chamber 10 providing a reservoir from which a lubricating oil is fed into the air stream in the passage 8 through an oil feed regulator (not shown) mounted in a recess 11 in the handle wall which divides the air passage 8 from the reservoir chamber 10 as shown in Fig. 1.

Bolted or otherwise rigidly secured to the front side of the frame section 3 is a tubular housing 12 enclosing the operative parts of the machine on the front side of the frame and mounting a reaction member or anvil 13 at the extreme front end of the tool. The anvil 13 is cylindric in form and has a sliding fit within a sleeve 14 which has a screw threaded connection with a bushing 15 fitted within a bore at the front end of the housing 12 as shown herein. A spring biased detent pin 16 carried by the housing 12 and extending through the bushing 15 engages the sleeve 14 at a circle of teeth 17 thereon for holding the sleeve 14 against accidental turning. A helical spring 18 normally urges the anvil inwardly, said spring surrounding the anvil within the sleeve 14 and bearing against shoulders on said respective parts.

The motor element 4 is of the rotary type having a cylinder 19 fixed against rotation within the frame section 3 and a rotor 20 eccentrically mounted within the cylinder 19 as shown in Fig. 12. The rotor 20 contacts with the cylinder 19 at one point only in its circumference to divide the cylinder into two crescent shaped chambers which co-operate with radial blades 21 slidably carried by the rotor in slots therein as in motor structures of this general type. The crescent shaped chambers provide for the expansion and exhaust, respectively, of the live air supplied to the motor 4 and control its rotation in reverse directions.

The ports for admitting and exhausting pressure fluid to and from the rotor cylinder 19 are shown at 22, 23, respectively, in Fig. 12. When the rotor 20 is rotated towards the right or clockwise as viewed in Fig. 12, the pressure fluid is admitted to the port 22 and exhausted at the port 23. The rotor is rotated in this righthand direction to screw the spindle or action member to be later described into the threaded portion of the tubular rivet to be installed. A reverse rotation of the rotor 20, that is counterclockwise to release the rivet, is accomplished by admitting pressure fluid at the port 23 and exhausting it at the port 22. This is under the control of the valve 7 as will be later described. As will be noted in Fig. 12, the motor element 4 is of relatively light power, four blades being employed, so that the rotor will stall easily as soon as the rivet being screwed on the spindle is drawn against the anvil 13.

The rotor 20 has shaft extensions 24, 24 at its opposite ends and these extensions serve to mount the rotor in ball bearing units 25, 25 incorporated in the motor structure as shown in Fig. 1. The motor has end plates 26, 26 at the respective bearings and these end plates complete the motor cylinder as shown in Fig. 1. As there illustrated, the end plates have a doweled connection with the intervening cylinder element 19.

Located within the housing 12 is a rivet engaging spindle or action member 27 slidably mounted at its forward end within the anvil 13 and connected at its inner end with the rotor 20 for rotation thereby. In the embodiment shown, this connection is made through a reducing gear drive 28 of the planetary type. The sun gear of this drive comprises gear teeth on the adjacent shaft extension 24 of the rotor 20 and planet gears 29, 29 on a carrier 30, the planets 29 meshing with the sun gear and the internal teeth of a ring gear 31 of the drive as shown in Fig. 1. The carrier 30 has a hub portion 32 with which the inner end of the spindle 27 is connected for direct rotation thereby. This connection comprises a non-circular head 33 at the inner end of the spindle fitting in a complementary shaped recess in the hub section 32 and clamped therein by a clamp nut 34 through which the spindle extends. The motor assembly 4 and its drive 28 are locked in place within the handle section 3 against shoulders therein by a nut element 26a screwed into the handle section at the rear end of the tool. This arrangement holds the spindle 27 against endwise movement within the tool case, providing, however, a swiveled connection of the spindle with the tool support.

The motor element 5 is of the reciprocating type having a cylinder 35 and a contained piston 36. The latter is secured to a piston rod 37 which extends into the housing 12 through the front header 38 of the cylinder 35, said header constituting an integral wall portion of the frame casting 1 as shown herein. The opposite or rear end of the cylinder 35 is closed by a cap element 39, which also closes the mounting for the motor element 4, secured in place by bolts or screws 40 as indicated in Fig. 1.

Located within the housing 12 is a power actuated lever 41 fulcrumed at 42 on the housing 12 between integral lug elements 43, 43 cast integral with the housing adjacent to its front end. The lever 41 is comprised of angularly disposed arm portions 44, 45, the former extending from the fulcrum 42 to the power delivering end 46 of the lever 41 and which power delivering end 46 engages the inner end of the anvil 13 in a slot therein to be later described. An extension 13c of anvil 13 provides an extended surface to the bottom of this slot. The arm portion 45 of the lever 41 extends rearwardly from the fulcrum 42 and has an underlying cam surface 47 which in the normal position of the lever 41 at the start of a riveting stroke is in angular relation to the piston rod 37. The latter extends between the lever arm 45 and a co-operating track-way 48 secured by screws 49 to the housing 12 below the lever arm 45 as shown in Fig. 1.

The piston rod 37 carries a driving head 50 at its outer end between the lever arm 45 and the track-way 48. Said driving head 50 is bifurcated having side walls 51, 51 between which are journaled upper and lower rollers 52, 52 on axis or shaft elements 53, 53 as shown in Fig. 2. Said axis elements 53 extend through spacer plates 54, 54 located between the side walls 51 to hold the rollers 52 in contact with the cam surface 47 and the track-way 48, respectively, and out of peripheral contact with each other. The axis elements 53 extend through vertically elongated slots 55 in the walls 51 of the driving head 50 to compensate the roller action to any variation of the spacing between the cam surface 47 and the track-way 48. The shaft elements 53 are locked in place and the lever 41 is provided in its upper portion with a channel or groove 56 to accommodate the spindle 27 whereby the power delivering end 46 of the lever 41 may straddle the spindle and apply power approximately along the center line of the anvil 13.

The control valve 7 is in the form of a cylindric member rotatably mounted within a complementary shaped bushing 57 stationarily fitted within the handle 2 at the location for the valve. The forward end of the valve 7 is flanged at 58 to overlie the adjacent end of the bushing 57 to hold the valve in place. This flange 58 has a complement of peripheral ratchet teeth 59 engaged by a spring 60 to hold the valve from a reverse turning. The spring 60 is mounted in a housing section 61 secured over the front end of the valve 7 by one or more screw elements 62 as shown in Figs. 1 and 3. This housing section 61 provides a chamber 63 in which the valve flange 58 and the spring 60 are located. The front end of this chamber is closed by a cover plate 64 secured in place by the screws 62.

Figure 6:
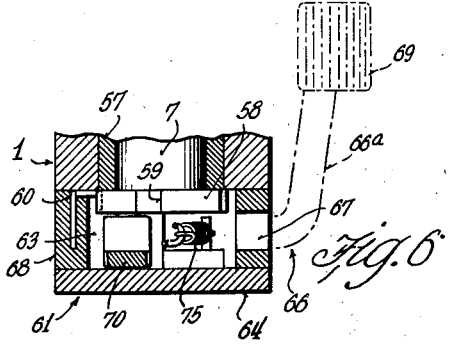
Fig. 6 is a cross-sectional view taken on line 6—6 of Fig. 3, part of the actuating trigger lever being indicated in broken lines.
Figure 10:
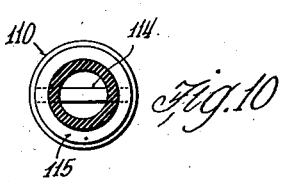
Fig. 10 is a cross-sectional view taken on line 10—10 of Fig. 9.

Pivoted in the chamber 63 on a pivot pin 65 is trigger lever 66. The latter extends out of the chamber 63 through a slot 67 in the surrounding body portion 68 of the housing section 61. Beyond the slot 67, the trigger lever 66 has an angular end portion 66a extending alongside the handle 2 to be within easy access for actuation and is provided at its outer end with a serrated thumb piece 69 as shown in broken lines in Fig. 6. With the arrangement disclosed, the operator holding the tool may conveniently depress the trigger lever to turn the valve 7 to its various positions for supplying pressure fluid to the tool motors in the sequence required for a rivet installing and compressing operation.

Figure 4:
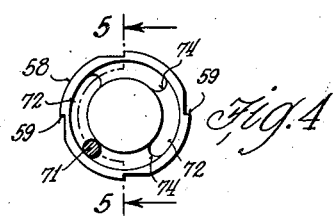
Fig. 4 is an end view of said control valve to show the ratchet arrangement thereon.
Figure 5:
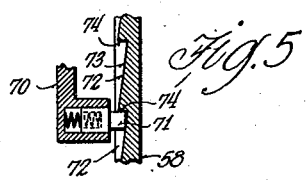
Fig. 5 is a sectional view taken on the curved line 5—5 of Fig. 4 to show the step-shaped grooves and the spring biased plunger engageable therewith.
Figure 9:
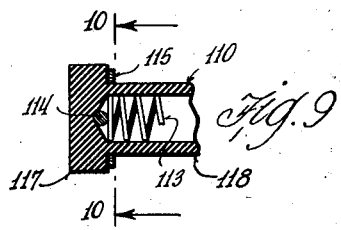
Fig. 9 is a sectional view of a detail of construction to be hereinafter described.

To turn the valve member from the trigger lever 66, I provide a ratchet mechanism comprising an arm 70 pivoted to the inner end of the trigger lever and overlying the front end of the valve member within the housing chamber 63. A spring biased plunger 71 is carried at the lower or free end of the arm 70 and presses against the front end of the valve member 7 to co-act with a series of forwardly opening, arcuate guide grooves 72 as detailed in Figs. 4 and 5. The grooves 72 are arranged in a circle about the valve axis and have inclined bottom walls 73 interposed by shoulders 74 both of which provide a stepped formation for turning the valve member 7 by the arm 70 on each depression of the trigger lever 66. The shoulders 74 have a ninety degree spacing for imparting quarter turns to the valve. A spring action 75 returns the trigger lever 66 to its starting position and the plunger snaps over the next shoulder to be engaged. The spring 75 is anchored at its lower end in the housing chamber 63 and is connected at its upper end to the trigger lever 66 at a lug 76 thereon. The circular sides of the grooves 72 maintain the plunger 71 within the path of the shoulders.

The tool structure shown and described operates as follows:

In the normal or starting position of the parts as shown in Fig. 1, the valve 7 is in its first or neutral position as detailed in Figs. 12 and 13. At this time the piston 36 is at the forward end of the cylinder 35 and the inlet port 77 in the valve bushing 57 and which port connects with the main supply passage 8 in the tool handle 2 is closed by the valve body as shown in Figs. 12 and 13—X and 13—C, the latter being taken on line C—C of Fig. 13—X. This cuts off the flow of live air to both of the tool motors 4, 5. The driving head 50 on the piston rod 37 is now at the end of its stroke nearest to the fulcrum 42 of the lever 41 and the spring 18 has returned the anvil 13 and the lever 41 to their starting positions as shown in Fig. 1. The arm portion 45 of the lever 41 is now at an angle or inclination to the line of movement of the piston rod 37 and the spindle 27 which extends through an aperture in the anvil 13 has its threaded outer end 78 projecting beyond the plunger to be engaged with the threaded portion 79 of the tubular rivet 80 to be installed and collapsed by the tool.

In establishing the foregoing connection, the rivet 80 is held by the operator between the fingers of one hand and applied over the threaded end 78 of the spindle, the latter being inserted into the tubular stem 81 of the rivet through its outer flanged end 82 until the threaded end 78 of the spindle engages the threaded portion 79 of the rivet. Now, the operator holding the rivet against turning depresses the trigger lever 66 to turn the valve 7 its first quarter turn into the position shown in Fig. 14. This connects the ports 77 and 83 in the bushing 57 through a recess 84 in the valve member and live air is supplied to the rotary motor through its port 22 to rotate the spindle 27 to screw the same into the threaded portion 79 in the tubular rivet. The operator holds the rivet until the threaded connection draws the flanged end 82 of the rivet against the anvil 13. The latter due to its interconnection with the lever 41 is held against rotation and the motor stalls and ceases to revolve when the rivet is brought against the anvil 13.

The interconnection just above mentioned, comprises the co-action of the sides of the lever 41 at its power delivering end 46 with the sides 13a, 13a of a milled slot 13b in the anvil 13 at its inner end as detailed in Fig. 2A. As shown in Fig. 1, the bottom of the slot 13b is curved for ease of movement of the lever against the inner end of the anvil 13.

When the valve 7 is in its first and second rotative positions just above described and as shown in Figs. 13 and 14, the valve body closes the bushing port 85 and live air is cut off to the casing passage 86 which connects the bushing port 85 with the forward port 87 at the front end of the cylinder 35. Live air may enter the rear end of the cylinder 35 from the bushing port 83 through the rear port 88 in the cylinder and the interconnected casing passages 89, 90 which connect the bushing port 83 with the motor ports 22 and 88, respectively, as shown in Fig. 12. This, however, does not affect the position of the piston 36 in the cylinder 35 for the reason that said piston is at the front end of the cylinder at the limit of its return stroke. Motor port 23 is connected at this time to the exhaust through bushing ports 91, 92 and the intervening recess 93 in the valve body 7 as shown in Figs. 13—D and 14—D, respectively. Port 23 is connected with the bushing port 91 by a passage 94 in the tool casing.

Figure 8:
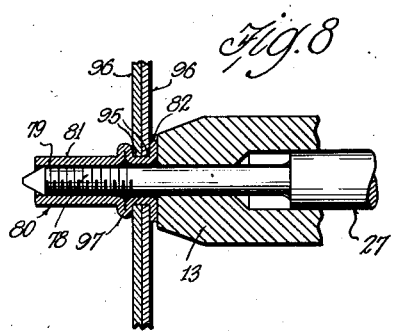
Fig. 8 is a similar view of the same parts showing the rivet after being collapsed or upset by the tool.

After the rivet 80 has been engaged with the spindle 27 and seated against the outer end of the anvil 13, the rivet is inserted by the tool into the registering openings 95 in the plates or parts 96, 96 to be riveted and clamped together as shown in Fig. 8. This is done from the accessible or outer side of the assembled plates, and the operator holding the tool presses the flanged end 82 of the rivet against the outermost of said plates. The latter which constitute the work are fixed against movement and resist this pressure. The operator then depresses the trigger lever 66 to turn the valve 7 into its third quarter position as shown in Fig. 15. Now, live air is supplied to the forward end of the cylinder 35 on the front side of the piston 36 and the piston is forced rearwardly on its riveting stroke to press the lever 41 against the anvil 13 to project the latter outwardly of the tool casing 1—12. This forces the flanged end of the rivet against the outermost of the stationary plates and the resulting action is that the tool casing or support 1—12 and the spindle 27 connected thereto are moved endwise in unison rearwardly in respect to the anvil to collapse the tubular stem 81 of the rivet against the innermost of the plates as indicated at 97 in Fig. 8. It will be noted that the rivet stem is collapsed in its portion between the innermost plate 96 and the threaded portion 79 of the rivet as engaged by the spindle 27. The riveting pressure increases gradually as the cam surface 47 on the lever 41 approaches parallelism with the piston rod 37, the driving head 50 being moved away from the fulcrum 42 of the lever and its power delivering end 46 on the riveting stroke.

With the valve 7 in this third quarter position as shown in Fig. 15, it will be noted that the inlet port 77 is now connected with the bushing port 85 through the connected passages 98, 98a, 98b in the valve body as shown in Fig. 15—X and the sectional views Figs. 15A and 15—C. The exhaust from the rear end of the cylinder 35 is through the cylinder port 88, casing passages 90 and 89, and valve bushing ports 83 and 92 which are connected at this time by the port 84 in the valve member 7 as shown in Fig. 15—B. Casing passages 90 and 89 are connected with the port 22 of the rotary motor as shown in Fig. 12 and the exhaust air from the rear end of the cylinder 35 may enter the rotary motor through port 22. The rotary motor 20 is, however, at this time open to the exhaust port 92 through motor port 23, casing passage 94, bushing port 91 and valve port 93 as shown in Fig. 15—D. The alternate path for the exhaust air precludes the possibility of the pressure being appreciably above atmospheric pressure and the rotary motor 20 is not turned to effect the screw threaded connection of the spindle 27 with the tubular rivet 81. The bushing port 92 is connected to the atmosphere through an exhaust outlet (not shown) in the tool casing 1—3. When the piston 36 completes its rearward or riveting stroke, the operator again depresses the trigger lever 66 to turn the valve 7 into its fourth quarter position as shown in Fig. 16.

When this fourth quarter position is reached, the valve 7 has been turned to cut off the flow of live air to the front end of the cylinder 35 at the bushing port 85 as shown in Figs. 16—X and 16—A. Inlet port 77 is now connected with the bushing port 91 through valve recess 93 as shown in Figs. 16—X, 16—C and 16—D and live air is supplied to the rotary motor port 23. The rotor is now rotated in reverse and the spindle 27 is unscrewed from the threaded portion 79 of the collapsed rivet and the tool is freed for the next rivet installing operation. The exhaust from the motor 4 is through the motor port 22, passage 89, bushing ports 83, 92 and valve recess 84. Some of this exhaust air which is still under pressure enters the cylinder port 88 through passage 90 and forces the piston 36 on its forward or return stroke to the starting position as shown in Fig. 1. The spring 18 maintains the lever 41 against the driving head 50 and when the trigger lever is again depressed to stop the reverse rotation of the motor 4 and the return stroke of the piston, the valve 7 is turned to its starting or neutral position as shown in Fig. 13. The tool is now ready for the next rivet to be installed and the operations just above described are repeated in the order stated.

In the diagrams shown in Figs. 13 to 16 inclusive, it may be pointed out that the same pattern is followed throughout all of the figures, the sections being taken on section lines corresponding to those marked in Fig. 13. It also may be remarked that the trigger lever 66 is depressed to its fullest extent on each valve turning stroke, the trigger lever being returned to its starting position when released by the spring action hereinbefore mentioned.

The signal for the tool comprises an electric lamp 99 mounted in the end cap 39 of the tool in a cavity 100 behind a translucent cover 101. The light bulb or the cover or both may be given a distinctive color, for example red, to readily call attention thereto when lighted. The lamp 99 is grounded to the metal frame or tool support 1 and is connected by a wire 102 with a dry cell battery 103 located in a chamber 104 provided therefor in the front casing 12 of the tool assembly. This chamber 104 is normally closed by a cover plate 105 fastened to the tool casing 12 and removable for battery replacement. The battery when inserted in the chamber 104 has its rear pole in electrical connection with a contact 106 mounted in an insulator 107 at the rear end of the chamber and in contact with a spring biased terminal 108 in an insulating sleeve 109 and to which terminal the conduction wire 102 is connected. This connection may also be made by extending the wire 102 into the space between the insulator disc 107 and the sleeve 109 and connecting the wire by a terminal clip engaged by a screw at the outer end of the contact plug 108.

Located at the front end of the chamber 104 is a telescopic cartridge 110 of insulating material having a contact 111 which is pressed against the forward terminal 112 of the battery. The coiled spring 113 of the cartridge which performs this function seats against a metal cross-pin 114 at the front end of the cartridge and which pin has its opposite ends soldered to a contact ring 115 carried by the cartridge in the path of a lug projection 116 at the inner end of the anvil 13.

When the parts just above described are in their normal or starting positions as shown in Fig. 1, the lug 116 is out of contact with and spaced rearwardly of the contact ring 115 and the electrical circuit to the lamp 99 is open. On a riveting stroke, when the plate 115 is brought into contact with the lug 116, the lamp circuit is closed and the lamp is ignited. This indicates to the operator that the riveting stroke of the tool is complete and that the rivet has been collapsed or upset. The operator then depresses the trigger lever 66 to unscrew the spindle 27 from the rivet. It is to be understood, that the anvil 13 is of metal to complete the lamp circuit when the contacts 115, 116 are engaged.

The sleeve 14 and the bushing 15 provide an adjustable mounting in the tool support so that the riveting stroke of the tool may be adjusted to determine the amount of set or compression given to the rivet in upsetting the same. This provides for proper upsetting of the rivets to clamp the plates together and avoids checking or cracking of the folded metal in the upset portion 97 of the rivet from an excess of pressure from a longer than desired riveting stroke, this being essential because the upsetting action takes place on the inner side of the plates and is not visible to the operator in these blind riveting operations. The adjustment is made by screwing the sleeve 14 inwardly or outwardly to lengthen or shorten the riveting stroke. The length of the stroke is controlled by the spacing between the inner end of the sleeve 14 and the lug 116 at the inner end of the plunger 13. Hence, by varying this spacing, the extent to which the lever 41 must be moved to upset a rivet may be controlled. To facilitate turning the sleeve 14 for adjustment, its outer end 14a is fashioned to be engaged by a wrench or other turning instrument. The sleeve 14 is made accessible for this purpose on unscrewing the cover cap 12a from the front end of the tool housing 12.

In all instances of anvil adjustment, the lamp circuit contacts 115, 116 follow the same spacing whereby the signal will go on at the terminus of the riveting stroke. This follows from the fact that the headed end 117 of the movable member 118 of the cartridge 110 follows along with the sleeve 14 in adjusting the same. Failure of the lamp to ignite on a riveting stroke prompts the operator to hold the tool against the rivet until the lamp signals a completion of the riveting stroke. This insures proper and effective riveting operations which in these blind riveting conditions are not visible to the operator.

The riveting tool of my invention is simple in construction and operation and effective in installing and compressing these tubular rivets. The tool provides ample power for the upsetting operation and added to this is the important factor of having a single control for operating both of the tool motors, whereby the manipulation of the tool is materially simplified.

The details of construction and arrangement of parts shown and described may be variously changed and modified without departing from the spirit and scope of my invention, except as pointed out in the annexed claims.

I claim as my invention:

1. A tool for installing internally threaded tubular rivets, said tool comprising a support, an anvil relatively slidably mounted in the support for engaging the rivet, a rotary spindle having a swiveled connection with the support and fixed against endwise movement with respect thereto, said spindle extending through the anvil and having a threaded outer end for engagement with the threaded portion of the rivet, and means in the support for rotating the spindle and other means for projecting the anvil outwardly relatively to the support for respectively engaging and disengaging the spindle with respect to the rivet and collapsing the rivet engaged by the spindle.

2. A tool for installing internally threaded tubular rivets, said tool comprising a support, an anvil relatively slidably mounted in the support for engaging the rivet, a rotary spindle having a swiveled connection with the support and fixed against endwise movement with respect thereto, said spindle extending through the anvil and having a threaded outer end for engagement with the threaded portion of the rivet, two motor means in the support, one for rotating the spindle for engaging and disengaging the same with respect to the rivet, and the other for projecting the anvil outwardly relatively to the support for collapsing the rivet engaged by the spindle, and means for controlling the operation of said respective motor means.

3. A tool for installing internally threaded tubular rivets, said tool comprising a support, an anvil relatively slidably mounted in the support for engaging the rivet, a rotary spindle having a swiveled connection with the support and fixed against endwise movement with respect thereto, said spindle extending through the anvil and having a threaded outer end for engagement with the threaded portion of the rivet, a lever fulcrumed in the support, and means in the support for rotating the spindle and other means for pressing the lever against the anvil for respectively engaging and disengaging the spindle with respect to the rivet and projecting the anvil outwardly relatively to the support for collapsing the rivet engaged by the spindle.

4. A tool for installing internally threaded tubular rivets, said tool comprising a support, an anvil relatively slidably mounted in the support for engaging the rivet, a rotary spindle having a swiveled connection with the support and fixed against endwise movement with respect thereto, said spindle extending through the anvil and having a threaded outer end for engagement with the threaded portion of the rivet, a lever fulcrumed on the support and having a cam surface at its power receiving end, and two power actuated means in the support, one for rotating the spindle and the other acting on the cam surface of the lever for respectively engaging and disengaging the spindle with respect to the rivet and pressing the lever against the anvil for projecting the same outwardly relatively to the support to collapse the rivet engaged by the spindle.

5. A tool for installing internally threaded tubular rivets, said tool comprising a support, an anvil relatively slidably mounted in said support for engaging the rivet, a rotary spindle having a swiveled connection with the support and fixed against endwise movement with respect thereto, said spindle extending through the anvil and having a threaded outer end for engagement with the threaded portion of the rivet, a lever fulcrumed on the support and having a cam surface at its power receiving end, a reciprocable driving element in the support and acting on the cam surface of the lever for pressing the lever against the anvil for projecting the same outwardly relatively to the support to collapse the rivet engaged by the spindle, and two power operated means in the support, one for reciprocating the driving element and the other for rotating the spindle with respect to the rivet.

6. A tool for installing internally threaded tubular rivets, said tool comprising a support, an anvil relatively slidably mounted in the support for engaging the rivet, a rotary spindle having a swiveled connection with the support and fixed against endwise movement with respect thereto, said spindle extending through the anvil and having a threaded outer end for engagement with the threaded portion of the rivet, a lever fulcrumed on the support and having a cam surface at its power receiving end, a track-way on the support in opposition to said cam surface, a reciprocable driving head in the support interposed between and acting on the track-way and the cam surface, respectively, when moved therealong away from the fulcrum for pressing the lever against the anvil to project the same outwardly relatively to the support to collapse the rivet engaged by the spindle, and two power operated means in the support, one for reciprocating the driving head and the other for rotating the spindle to engage and disengage the same with respect to the rivet.

7. A tool for installing internally threaded tubular rivets, said tool comprising a support, relatively movable action and reaction members mounted in said support, the action member being in the form of a rotary spindle having a threaded outer end for engagement with the threaded portion of the rivet, and means in the support for rotating the spindle with respect to the rivet and other means for collapsing the rivet engaged by the spindle by pressing on the reaction member to move the spindle and the support relatively thereto.

8. A tool for installing internally threaded tubular rivets, said tool comprising a support, relatively movable action and reaction members mounted in said support, the action member being in the form of a rotary spindle having a threaded outer end for engagement with the threaded portion of the rivet, two pressure fluid responsive means in the support, one for rotating the spindle with respect to the rivet, and the other for collapsing the rivet engaged by the spindle by pressing on the reaction member to move the spindle and the support relatively thereto, and means for controlling the supply of pressure fluid to said respective pressure fluid responsive means.

9. A tool for installing internally threaded tubular rivets, said tool comprising a support, an anvil carried thereby, a spindle mounted in the support and having rotation relatively to the anvil, said spindle having a threaded outer end for engagement with the threaded portion of the rivet, power actuated means in the support and having a riveting stroke operable through the spindle for collapsing the rivet engaged by the spindle and the anvil, other means for rotating the spindle to engage and disengage the same with respect to the rivet, and electrical signal means on the support and operable in response to the riveting stroke of the tool on closing contacts in the signal circuit for indicating a completion of said stroke.

10. A tool for installing internally threaded tubular rivets, said tool comprising a support, an anvil carried thereby, a rotary spindle mounted in the support and having a threaded outer end for engagement with the threaded portion of the rivet, power operated means in the support and having a riveting stroke operable through the spindle for collapsing the rivet engaged thereby, other means for rotating the spindle to engage and disengage the same with respect to the rivet, and an electrical signal and a switch and circuit therefor having separable contacts on the anvil and the support, respectively, and which contacts are closed in response to the riveting stroke of the tool for indicating the completion of said stroke.

11. A tool for installing internally threaded tubular rivets, said tool comprising a support, relatively movable anvil and rotary spindle elements mounted in the support, said spindle extending through the anvil and having a threaded outer end for engagement with the threaded portion of the rivet, power actuated means in the support for imparting relatively endwise movement to the anvil and the spindle for collapsing the rivet engaged by the spindle, other means for rotating the spindle with respect to the rivet, and an electrical signal and a switch and circuit therefor in the support, comprising separable contacts in the signal circuit on the support and the anvil, respectively, for closing the signal circuit at the terminus of the riveting stroke of the tool.

12. A tool for installing internally threaded tubular rivets, said tool comprising a support, relatively movable anvil and rotary spindle elements mounted in the support, said spindle extending through the anvil and having a threaded outer end for engagement with the threaded portion of the rivet, power operated means in the support for rotating the spindle with respect to the rivet and other means for collapsing the rivet engaged by the spindle by imparting relative endwise movement to the anvil and the spindle in the riveting stroke of the tool, and means providing a mounting for the anvil in the support comprising a sleeve threadedly connected therewith and housing a spring acting on the anvil, said sleeve acting for adjusting the length of said stroke to determine the set to be given to the rivet.

13. A tool for installing internally threaded tubular rivets, said tool comprising a support, relatively movable anvil and rotary spindle elements mounted in the support, said spindle extending through the anvil and having a threaded outer end for engagement with the threaded portion of the rivet, power actuated means in the support for rotating the spindle with respect to the rivet and other means for collapsing the rivet engaged by the spindle by imparting relative endwise movement to the anvil and the spindle in the riveting stroke of the tool, said anvil being spring biased in a sleeve threadedly mounted on the support, the threaded mounting of the sleeve permitting adjustent of the length of said stroke to determine the set to be given to the rivet, and a check device for holding the sleeve in its adjusted positions.

14. A tool for installing internally threaded tubular rivets, said tool comprising a support, relatively movable anvil and rotary spindle elements in said support, said spindle extending through the anvil and having a threaded outer end for engagement with the threaded portion of the rivet, two pressure fluid responsive means in the support, one operating through the anvil for collapsing the rivet engaged by the spindle, and the other rotating the spindle relatively to the rivet to engage and disengage the same, a single source of pressure fluid supply for both of said pressure fluid responsive means, and a single valve for controlling the supply of pressure fluid to said respective pressure fluid responsive means.

15. A tool for installing internally threaded tubular rivets, said tool comprising a support, relatively movable anvil and rotary spindle elements in the support, said spindle extending through the anvil and having a threaded outer end for engagement with the threaded portion of the rivet, two pressure fluid responsive means in the support, one operating through the anvil for collapsing the rivet engaged by the spindle, and the other for rotating the spindle with respect to the rivet to engage and disengage the same, a single source of pressure fluid supply for both of said pressure fluid responsive means, a rotary valve in the support for controlling the supply of pressure fluid to the respective pressure fluid responsive means, and a single actuating member for turning said valve.

16. A tool of the character defined in claim 15 characterized by the fact that the actuating means for the valve comprises a lever and a ratchet mechanism therefor in the support and on the valve, respectively.

17. A tool of the character defined in claim 15 characterized by the fact that the actuating means for the valve comprises a lever on the support, a ratchet mechanism on the valve having ratchet teeth about the valve axis, an arm pivoted to the lever and overlying the portion of the valve provided with said ratchet teeth, and a spring biased plunger carried by the arm and co-acting with said ratchet teeth for turning the valve.

18. A tool for installing internally threaded tubular rivets, said tool comprising a support, relatively movable action and reaction members in the support, one of said members being in the form of a rotary spindle extending through the other member and having a threaded outer end for engagement with the threaded portion of the rivet, two motor elements in the support, one for creating relative endwise movement between the action and reaction members for collapsing the rivet engaged by the spindle, and the other for rotating the spindle for engaging and disengaging the same with respect to the rivet, a rotary control means on the support for controlling the operation of said respective motor means, said control means having predetermined rotative positions for first screwing the spindle into the threaded portion of the rivet and then collapsing the rivet through the spindle and thereafter retracting the collapsing means and unscrewing the spindle from the rivet, and a single actuating member carried by the support for successively moving the control means through said respective rotative positions.

19. A tool for installing internally threaded tubular rivets, said tool comprising a support, an anvil slidably mounted in the support for engaging the rivet, a rotary spindle having a swiveled connection with the support and fixed against endwise movement with respect thereto, said spindle extending through the anvil and having a threaded outer end for engagement with the threaded portion of the rivet, power operated means including a lever fulcrumed on the support for pressing the anvil outwardly relatively to the support for collapsing the rivet engaged by the spindle, other means for rotating the spindle with respect to the rivet, and an interconnection between the lever and the anvil for holding the latter against rotation.

20. A tool for installing internally threaded tubular rivets, said tool comprising a support, relatively movable anvil and rotary spindle elements mounted in the support, said spindle being connectible with the rivet through its threaded portion, power actuated means in the support for rotating the spindle to connect and disconnect the same with respect to the rivet and other means to upset the rivet connected with the spindle by imparting relative endwise movement to the anvil and the spindle on the riveting stroke of the tool, and means for adjusting the length of said stroke to determine the set to be given to the rivet including coacting abutments on the support and the anvil, respectively, the spacing between the abutments being varied to determine the length of said stroke.

21. A tool for installing internally threaded tubular rivets, said tool comprising a support, a sleeve threadedly mounted in said support, a spring biased anvil slidably mounted in said sleeve and normally projecting beyond the outer end of the same, a spindle revolubly and slidably mounted in the anvil and extending therethrough and connectible at its outer end with the threaded portion of the rivet to be upset by the tool, power actuated means in the support for rotating the spindle to connect and disconnect the same with respect to the rivet and other means to upset the rivet connected with the spindle by imparting relative endwise movement to the anvil and the spindle in the riveting stroke of the tool, said sleeve and the anvil having coacting abutments to determine the riveting stroke of the tool, and said sleeve having its outer end formed to be engaged for turning the sleeve relatively to the anvil to adjust the spacing between said abutments.

22. A tool of the character defined in claim 21 characterized by the fact that a cap device fits on the support over the outer end of the sleeve and that the anvil and spindle elements extend through said cap device.

WALTER GEORGE MITCHELL.